United States Patent Office 3,109,010
Patented Oct. 29, 1963

3,109,010
ORGANOMETALLIC COMPOUNDS
Geoffrey Wilkinson, London, England, assignor to Ethyl Corporation, New York, N.Y., a corporation of Virginia
No Drawing. Filed Jan. 23, 1961, Ser. No. 83,919
Claims priority, application Great Britain Feb. 2, 1960
16 Claims. (Cl. 260—429)

This invention relates to new and improved organometallic compounds and improved methods for their preparation. More specifically, it relates to the formation of binuclear substituted cyclopentadienyl-group VIB-metal-tricarbonyl compounds by reaction of a group VIB metal carbonyl and a substituted fulvene compound. Another aspect of my invention is a process whereby a binuclear substituted cyclopentadienyl-group VIB metal-tricarbonyl compound is reacted with a halogen to form a substituted cyclopentadienyl-group VIB metal-tricarbonyl halide. Still another aspect of my invention concerns the reaction of a binuclear substituted cyclopentadienyl-group VIB metal-tricarbonyl compound with an alkali metal to give the alkali metal salt of a substituted cyclopentadienyl-group VIB metal-tricarbonyl compound. Another phase of my invention involves the reaction between an organo halide and the sodium salt of a substituted cyclopentadienyl-group VIB metal-tricarbonyl compound. There is formed from this reaction a substituted cyclopentadienyl-group VIB metal-organo tricarbonyl compound.

Still another aspect of my invention concerns the reaction of cyclopentadienyl-group VIB metal-tricarbonyl halide and the alkali metal salt of a cyclopentadienyl-group VIB metal-tricarbonyl compound to form a binuclear cyclopentadienyl-group VIB metal-tricarbonyl compound containing two dissimilar group VIB metal atoms which are bonded together by a metal-to-metal bond.

The first aspect of my invention, as defined above, relates to the reaction of a substituted fulvene compound and a group VIB metal carbonyl to form a binuclear substituted cyclopentadienyl group VIB metal-tricarbonyl compound. This reaction can be depicted as follows:

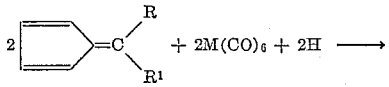 + 2M(CO)$_6$ + 2H $\longrightarrow$ $$\left[ R^1\!\!-\!\!\underset{H}{\overset{R}{C}}\!\!-\!\!C_5H_4M(CO)_3 \right]_2 + 6CO$$

In the above reaction, R and/or $R^1$ is a hydrocarbon group which preferably contains up to about 13 carbon atoms, and M is a group VIB metal, i.e., chromium; molybdenum or tungsten. Also, R or $R^1$ can be hydrogen. As shown above, hydrogen is taken up in the reaction. This hydrogen can be derived from excess quantities of the substituted fulvene reactant or from a solvent from which hydrogen can be abstracted. Preferred solvents for use in carrying out my reaction are those, such as ethylene glycol dimethyl ether, from which it is known that hydrogen can be abstracted.

In my process, a substituted fulvene is reacted with a group VIB metal carbonyl at temperatures generally ranging between about 75 and about 200° C. The reaction is preferably carried out under a blanketing atmosphere of an inert gas such as nitrogen and is customarily carried out at atmospheric pressure although increased pressures can be used if desired. In order to insure utilization of the group VIB metal carbonyl reactant, I customarily employ excess quantities of the substituted fulvene reactant. Generally, from about one to about 10 moles of the substituted fulvene are employed for each mole of the group VIB metal carbonyl reactant.

To further illustrate my process, there are presented the following examples in which all parts and percentages are by weight unless otherwise indicated.

EXAMPLES I THROUGH IX

One mole of molybdenum hexacarbonyl and 1.5 moles of a substituted fulvene in 50 ml. of ethylene glycol dimethyl ether were heated at reflux for six hours under nitrogen. During this period, considerable carbon monoxide was evolved, and the reaction mixture became a deep-red in color. Volatile material was then removed by heating the reaction mixture at 60° under a pressure of $10^{-3}$ mm., and the red residue was extracted with a petrol-benzene mixture. After purification of the residue by chromatography through an alumina column, the substituted di(cyclopentadienyl molybdenum tricarbonyl) was recrystallized from light petrol as fine red crystals.

*Table I*

REACTION OF MOLYBDENUM CARBONYL WITH A SUBSTITUTED FULVENE HAVING THE FORMULA

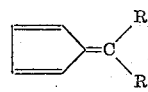

| | $R''{=}\underset{R}{\overset{R'}{C}}$ in the $[C_5H_4R''Mo(CO)_3]_2$ Product | Yield, percent | Mol. wt. | | Found, percent | | | | Required, percent | | | |
|---|---|---|---|---|---|---|---|---|---|---|---|---|
| | | | Found | Req. | C | H | Mo | O | C | H | Mo | O |
| Example I | n-Propyl | 20 | 588 | 574 | 46.0 | 3.7 | 33.2 | ------ | 45.9 | 3.8 | 33.5 | ------ |
| Example II | Iso-propyl | 42 | 619 | 574 | 45.5 | 4.2 | 33.6 | 16.9 | 45.9 | 3.8 | 33.5 | 16.7 |
| Example III | 1-methyl-n-propyl | 70 | 614 | 602 | 48.3 | 4.1 | 32.8 | 15.9 | 47.8 | 4.3 | 31.9 | 15 |
| Example IV | 1-ethyl-n-propyl | 45 | 678 | 630 | 50.0 | 4.8 | 30.9 | 14.9 | 49.5 | 4.8 | 30.5 | 15.2 |
| Example V | 1-methyl-n-butyl | 62 | 645 | 630 | 50.4 | 5.1 | 30.5 | 15.2 | 49.5 | 4.8 | 30.5 | 15.2 |
| Example VI | 1-phenyl-ethyl | 30 | 702 | 698 | 55.4 | 4.0 | 27.8 | 13.8 | 55.0 | 3.7 | 27.5 | 13.8 |
| Example VII | Diphenyl-methyl | 30 | 862 | 822 | 61.5 | 4.3 | 22.9 | ------ | 61.3 | 3.7 | 23.4 | ------ |
| Example VIII | Anisyl-methyl | 60 | 717 | 730 | 53.2 | 4.1 | 26.4 | ------ | 52.6 | 3.6 | 26.3 | ------ |
| Example IX | Cyclohexyl | 20 | 670 | 654 | 51.5 | 4.9 | 29.1 | 14.5 | 51.4 | 4.6 | 29.4 | 14.7 |

The results of this experimental technique as applied to various substituted fulvene compounds are set forth in the table which forms a part of Examples I through IX.

EXAMPLE X

Using the same reaction technique as described above for Examples I–IX, di(isopropylcyclopentadienyl tungsten tricarbonyl) was prepared in a 10 percent yield by reaction of tungsten hexacarbonyl and dimethyl fulvene. Found: C, 34.6; H, 3.4; W, 48.2 percent with a molecular weight of 723. $C_{22}H_{22}O_6W_2$ requires: C, 35.2; H, 2.9; W, 49.1 percent with a molecular weight of 750.

EXAMPLE XI

Using the same reaction technique as employed in Examples I–X, I prepared the compound, di(1-ethyl-n-propyl cyclopentadienyl tungsten tricarbonyl) by reaction of diethyl fulvene with tungsten hexacarbonyl. There was obtained an eight percent yield of the compound having an analysis of: C, 38.8; H, 2.8; W, 46.1 percent with a molecular weight of 806. $C_{22}H_{22}O_6W_2$ requires: C, 38.6; H, 3.7; W, 45.7 percent with a molecular weight of 795.

The compounds prepared in Examples I–XI were subjected to infrared spectrometry and further, their melting points were determined. This information is set forth in the following table:

*Table II*

DI(SUBSTITUTED-π-CYCLOPENTADIENYL METAL TRICARBONYL)S OBTAINED BY DIRECT INTERACTION OF METAL CARBONYL AND THE CORRESPONDING FULVENE

| R'' in $[R''-C_5H_4M(CO)_3]_2$ | M. | M.P. | Colour | CO stretching modes | |
|---|---|---|---|---|---|
| | | | | Cm.⁻¹ | All strong |
| n-Propyl | Mo | d. 200 | Red | 1,967 | 1,916 |
| Iso-propyl | Mo | 163 | Red | 1,964 | 1,916 |
| 1-menthyl-n-propyl | Mo | 170 | Red | 1,964 | 1,913 |
| 1-ethyl-n-propyl | Mo | 152 | Red | 1,962 | 1,916 |
| 1-methyl n-butyl | Mo | 117–119 | Red | 1,962 | 1,912 |
| 1-phenyl ethyl | Mo | d. 125 | Dark red | 1,962 | 1,912 |
| Diphenyl methyl | Mo | 203–205 | Brown | 1,961 | 1,916 |
| Anisyl-methyl | Mo | d. 103 | Brown | 1,961 | 1,916 |
| Cyclohexyl | Mo | 180 | Red | 1,961 | 1,911 |
| Isopropyl | W | 195 | Red | 1,958 | 1,906 |
| 1-ethyl n-propyl | W | 184 | Red | 1,960 | 1,905 |

Further, certain of the compounds produced in Examples I–XI were subjected to ultraviolet spectrometry. Their ultraviolet spectra are set forth in the following table:

*Table III*

ULTRAVIOLET ABSORPTION SPECTRA OF THE DI(SUBSTITUTED-π-CYCLOPENTADIENYL METAL TRICARBONYL) COMPOUNDS

| R'' in $[R''-C_5H_4M(CO)_3]_2$ | M. | Absorption maximum | | Absorption maximum | |
|---|---|---|---|---|---|
| | | Wavelength (mμ) | $\epsilon_{max}$ | Wavelength (mμ) | $\epsilon_{max}$ |
| H | Mo | 386 | 22,000 | 510 | 2,150 |
| Isopropyl | Mo | 393 | 15,070 | 510 | 3,123 |
| 1-ethyl n-propyl | Mo | 395 | 15,050 | 515 | 1,645 |
| 1-methyl n-propyl | Mo | 400 | 18,060 | 517 | 1,982 |
| 1-methyl n-butyl | Mo | 398 | 19,240 | 512 | 3,436 |
| Diphenyl methyl | Mo | 394 | 13,900 | 512 | 2,978 |
| 1-phenyl ethyl | Mo | 390 | 18,750 | 513 | 2,360 |
| Anisyl methyl | Mo | 395 | 16,340 | 513 | 2,340 |
| H | W | 360 | 16,700 | 490 | 1,540 |
| Isopropyl | W | 365 | 26,250 | 492 | 4,000 |
| 1-ethyl n-propyl | W | 365 | 31,300 | 493 | 3,793 |

On the basis of the infrared and ultraviolet spectra of the compounds prepared in Examples I–XI, their structure was clearly established as being a binuclear substituted cyclopentadienyl-group VIB metal-tricarbonyl having the configuration:

$$R''-C_5H_4(CO)_3M-M(CO)_3C_5H_4-R''$$

As stated previously, another phase of my invention involves the reaction between a binuclear substituted cyclopentadienyl-group VIB metal-tricarbonyl compound and a halogen to form a substituted cyclopentadienyl-group VIB metal-tricarbonyl halide. In this reaction, any halogen can be employed. Preferably, however, iodine is used since it gives good yields of the desired compounds with a minimum of undesirable side reactions. The reaction may be performed at normal temperatures and pressures in the presence of a non-reactive solvent. To further illustrate this process, there are presented the following examples in which all parts and percentages are by weight unless otherwise indicated.

EXAMPLES XII–XVII

One mole of substituted di(cyclopentadienyl molybdenum tricarbonyl) compound, as prepared in Examples I–XI, was added dropwise to one mole of iodine in chloroform with constant agitation. After completing the addition, under a nitrogen atmosphere, the chloroform solution was extracted with aqueous sodium thiosulfate to remove any polyiodides which had formed. After separation, the chloroform was removed by heating at 20° C. at a pressure of 10 mm., and the residual brown mass was recrystallized from light petrol to yield a substituted cyclopentadienyl molybdenum tricarbonyl iodide. The results obtained using this general reaction procedure are set forth in the following table which forms a part of Examples XII through XVII.

*Table IV*

| | R'' in R''C₅H₄Mo(CO)₃I Product | Yield, percent | Mol. wt. | | Percent Found | | | | | Percent Required | | | | |
|---|---|---|---|---|---|---|---|---|---|---|---|---|---|---|
| | | | Found | Req. | C | H | Mo | O | I | C | H | Mo | O | I |
| Example XII | Isopropyl | 69 | 422 | 414 | 32.1 | 2.6 | 23.5 | 11.5 | | 31.9 | 2.7 | 23.2 | 11.6 | |
| Example XIII | 1-methyl-n-propyl | 70 | 450 | 428 | 32.7 | 2.8 | 22.6 | | 29.7 | 33.7 | 3.0 | 22.4 | | 29.7 |
| Example XIV | 1-ethyl-n-propyl | 43 | 476 | 442 | 34.6 | 3.5 | 22.0 | | 29.2 | 35.3 | 3.4 | 21.7 | | 28.7 |
| Example XV | 1-phenyl-ethyl | 59 | 488 | 476 | 40.8 | 3.2 | 20.0 | | 27.5 | 40.3 | 2.7 | 20.2 | | 26.7 |
| Example XVI | Anisyl-methyl | 70 | 510 | 492 | 39.5 | 3.2 | 14.5 | | 25.8 | 39.0 | 2.7 | 19.5 | | 25.8 |
| Example XVII | 1-methyl-n-butyl | 40 | 416 | 442 | 34.0 | 3.8 | 22.1 | | 29.0 | 35.3 | 3.4 | 21.7 | | 28.7 |

When Examples XII–XVII are repeated using halogens other than iodine as reactants, the corresponding substituted cyclopentadienyl molybdenum tricarbonyl chlorides and bromides are obtained. Similarly, by employing substituted di(cyclopentadienyl chromium tricarbonyl) and substituted di(cyclopentadienyl tungsten tricarbonyl) compounds as reactants, I obtain the corresponding substituted cyclopentadienyl chromium and tungsten tricarbonyl halides.

Another aspect of my invention involves the formation of the alkali metal salts of a substituted cyclopentadienyl-group VIB metal-tricarbonyl. These compounds result from reacting the alkali metal with a binuclear substituted cyclopentadienyl-group VIB metal-tricarbonyl compound as described in Examples I–XI. In this reaction, the metal-to-metal bond in the binuclear compound is cleaved, and the alkali metal is thereby bonded directly to the group VIB metal. Although any alkali metal may be employed in this reaction, I prefer sodium as the reactant.

The alkali metal salts of the substituted cyclopentadienyl-group VIB metal-tricarbonyl compounds are extremely useful compounds in that they may be reacted with a hydrocarbon halide to form a substituted cyclopentadienyl-group VIB metal-tricarbonyl hydrocarbon compound in which the hydrocarbon substituent is directly bonded to the metal atom along with the substituted cyclopentadienyl group and three carbonyl groups. This reaction may be carried out under normal conditions of temperatures and pressure and in the presence of a non-reactive solvent. To further illustrate the reaction, there are presented the following examples in which all parts and percentages are by weight unless otherwise indicated.

EXAMPLE XVIII

One mole of di(isopropylcyclopentadienyl) dimolybdenum hexacarbonyl in 0.312 mole of tetrahydrofuran was added to five moles of sodium shot suspended in 0.936 mole of tetrahydrofuran, and the solution was refluxed gently under nitrogen with stirring for three hours. During this time, a strong yellow coloration developed due to the formation of the sodium salt. After cooling, 0.032 mole of methyl iodide was added dropwise, and the mixture was refluxed for an additional one hour. The reaction mixture was then heated at 20° C. and under 10 mm. pressure to remove volatile matter. The dark oil which remained was sublimed to yield pure isopropylcyclopentadienyl methyl molybdenum tricarbonyl in 70 percent yield. Found: C, 48.1; H, 4.73; Mo, 30.8 percent with a molecular weight of 295. $C_{12}H_{11}MoO_3$ requires: C, 47.7; H, 4.6; Mo, 31.7 percent with a molecular weight of 302.

EXAMPLE XIX

Using the same procedure as set forth in Example XVIII, there was prepared the compound, isopropylcyclopentadienyl ethyl molybdenum tricarbonyl in 60 percent yield by reaction of the sodium salt of isopropylcyclopentadienyl molybdenum tricarbonyl and ethyl iodide. Found: C, 50.2; H, 5.2; Mo, 29.8 percent with a molecular weight of 298. $C_{13}H_{13}MoO_3$ requires: C, 49.4; H, 5.1; Mo, 30.4 percent with a molecular weight of 316.

EXAMPLE XX

Using the procedure employed in Examples XVIII and XIX, there was obtained a 60 percent yield of 1-ethyl-n-propylcyclopentadienyl methyl molybdenum tricarbonyl by reaction of the sodium salt of 1-ethyl-n-propylcyclopentadienyl molybdenum tricarbonyl and methyl iodide. Found: C, 52.1; H, 5.9; Mo, 28.2 percent with a molecular weight of 315. $C_{14}H_{13}MoO_3$ requires: C, 50.9; H, 5.5; Mo, 29.1 percent with a molecular weight of 330.

Another aspect of my invention involves the formation of binuclear mixed metal compounds in which dissimilar group VIB metal atoms are bonded together by a metal-to-metal bond. These compounds are formed by reaction of a cyclopentadienyl-group VIB metal-tricarbonyl halide compound and the alkali metal salt of a cyclopentadienyl-group VIB metal-tricarbonyl compound. The reaction may be carried out under normal conditions of temperature and pressure in the presence of a non-reactive solvent. To further illustrate this process, there is presented the following example in which all parts and percentages are by weight unless otherwise indicated.

EXAMPLE XXI

One mole of di(cyclopentadienyl molybdenum tricarbonyl) was added to four moles of sodium shot in 1.23 moles of tetrahydrofuran, and the mixture was refluxed for two hours under nitrogen. After cooling, the yellow solution of the sodium salt was filtered off from the excess metal and added to one mole of cyclopentadienyl tungsten tricarbonyl chloride in .374 mole of tetrahydrofuran under nitrogen. The yellow reaction mixture gradually became red. After refluxing for two hours, the reaction mixture was cooled, and volatile matter was removed by heating at 20° C. and 10 mm. Hg. The crude product was recrystallized from chloroform-petrol and chromatographed on alumina in petrol. There were obtained pure red crystals of cyclopentadienyl molybdenum cyclopentadienyl tungsten hexacarbonyl in 65 percent yield. The product had a melting point of 250° C., and on analysis there was found: C, 32.0; H, 1.81; Mo, 16.75; W, 32.1 percent with a molecular weight of 528. $C_{16}H_{10}MoWO_6$ requires: C, 33.2; H, 1.7; Mo, 16.6; W, 31.8 percent with a molecular weight of 578. The ultraviolet absorption spectra of the compound was obtained and gave the following results:

Absorption maximum: Wavelength (mμ), 374; ε max., 17,000. The other absorption maximum was as follows:

Wavelength (mμ), 498, and ε max., 2,540

On the basis of its ultraviolet absorption spectrum and the elemental analysis, the structure of the compound was clearly established as cyclopentadienyl molybdenum cyclopentadienyl tungsten hexacarbonyl.

The various organometallic compounds formed from my novel processes have a wide variety of utilities. They may be used as fuel additives by blending them with a hydrocarbon fuel of the gasoline boiling range. When used as antiknocks, they may be used as primary antiknocks in which case they are the sole antiknock ingredient in the fuel. Also, they may be used as supplemental antiknocks or wear inhibitors in which case they are present in the fuel in addition to primary antiknocks, such as organolead compounds or certain coordination compounds of manganese such as methylcyclopentadienyl manganese tricarbonyl.

Another use for my compounds is in metal plating. In this application, the compounds are thermally decomposed in an atmosphere of a reducing gas such as hydrogen or a neutral atmosphere such as nitrogen to form metal films. These films have a wide variety of applications in forming conductive surfaces such as in a printed circuit. Other uses for these metallic films are in decorating a substrate material or in preventing corrosion of a substrate material.

A still further use for my compounds is as additives to distillate and residual fuels such as home heater fuels, diesel fuels and jet engine fuels to prevent the formation of smoke and/or soot on combustion of the fuel. Still another use for my compounds is as additives to lubricants to improve their lubricity characteristics.

Having fully defined my novel compounds, their novel method of preparation, and their many utilities, I desire to be limited only within the lawful scope of the appended claims.

I claim:

1. Process comprising reacting a fulvene compound having the formula

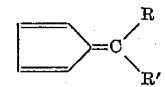

in which R is a hydrocarbon group containing up to about 13 carbon atoms and R' is selected from the group consisting of hydrocarbons containing up to about 13 carbon atoms and hydrogen with a group VIB metal hexacarbonyl and hydrogen to form a binuclear substituted cyclopentadienyl-group VIB metal-tricarbonyl compound having the formula

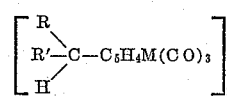

in which M is a group VIB metal.

2. The process of claim 1 in which the reaction is carried out under a blanketing atmosphere of an inert gas.

3. The process of claim 2 wherein the substituted fulvene reactant is employed in a quantity ranging from one to about 10 moles for each mole of the group VIB metal hexacarbonyl reactant.

4. The process of claim 3 in which the group VIB metal hexacarbonyl is molybdenum hexacarbonyl.

5. Organometallic compounds having the formula

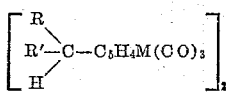

in which R is a hydrocarbon group containing up to about 13 carbon atoms and R' is selected from the group consisting of hydrocarbons containing up to about 13 carbon atoms and hydrogen, and M is a group VIB metal.

6. Process comprising reacting a binuclear substituted cyclopentadienyl-group VIB metal tricarbonyl compound having the formula

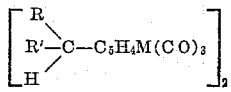

wherein R is a hydrocarbon group containing up to about 13 carbon atoms, and R' is selected from the class consisting of hydrogen and hydrocarbon groups having up to about 13 carbon atoms, with a halogen to form a substituted cyclopentadienyl-group VIB metal tricarbonyl halide.

7. The process of claim 6 in which the halogen reactant is iodine.

8. Process comprising reacting a binuclear substituted cyclopentadienyl group VIB metal tricarbonyl compound having the formula

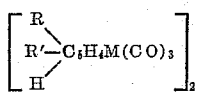

wherein R is a hydrocarbon group containing up to about 13 carbon atoms and R' is selected from the class consisting of hydrogen and hydrocarbon groups having up to about 13 carbon atoms, with an alkali metal to form an alkali metal salt of a substituted cyclopentadienyl-group VIB metal tricarbonyl.

9. The process of claim 8 in which the alkali metal reactant is sodium.

10. Process comprising reacting a cyclopentadienyl-group VIB metal-tricarbonyl halide with an alkali metal salt of a cyclopentadienyl-group VIB metal-tricarbonyl in which the group VIB metal present in the cyclopentadienyl-group VIB metal-tricarbonyl halide reactant is different than the group VIB metal present in the alkali metal salt of the cyclopentadienyl-group VIB metal-tricarbonyl reactant.

11. A binuclear mixed metal compound having the formula

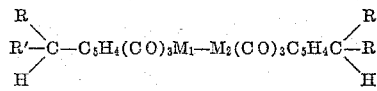

in which R and R' are selected from the group consisting of hydrocarbon groups containing up to 13 carbon atoms and hydrogen, $M_1$ is a group VIB metal, and $M_2$ is a group VIB metal which is different than $M_1$.

12. Cyclopentadienyl molybdenum cyclopentadienyl tungsten hexacarbonyl.

13. A compound according to claim 5 in which M is chromium.

14. A compound according to claim 5 in which M is tungsten.

15. Di - (n-propyl - cyclopentadienyl) dimolybdenum hexacarbonyl.

16. Di-(phenylethyl-cyclopentadienyl) dimolybdenum hexacarbonyl.

References Cited in the file of this patent
UNITED STATES PATENTS

| | | |
|---|---|---|
| 2,835,686 | Graham | May 20, 1958 |
| 2,922,805 | Kaufman | Jan. 26, 1960 |

FOREIGN PATENTS

| | | |
|---|---|---|
| 782,738 | Great Britain | Sept. 11, 1957 |

OTHER REFERENCES

Abel et al.: "Proceedings Chem. Soc., London," pages 152–153, May 1958.

Burton et al.: "Chem. and Ind.," page 1205 (Sept. 13, 1958).